May 7, 1940.    P. K. SAUNDERS    2,199,549
FLUID CONTROLLING VALVE
Filed June 7, 1939    2 Sheets-Sheet 1
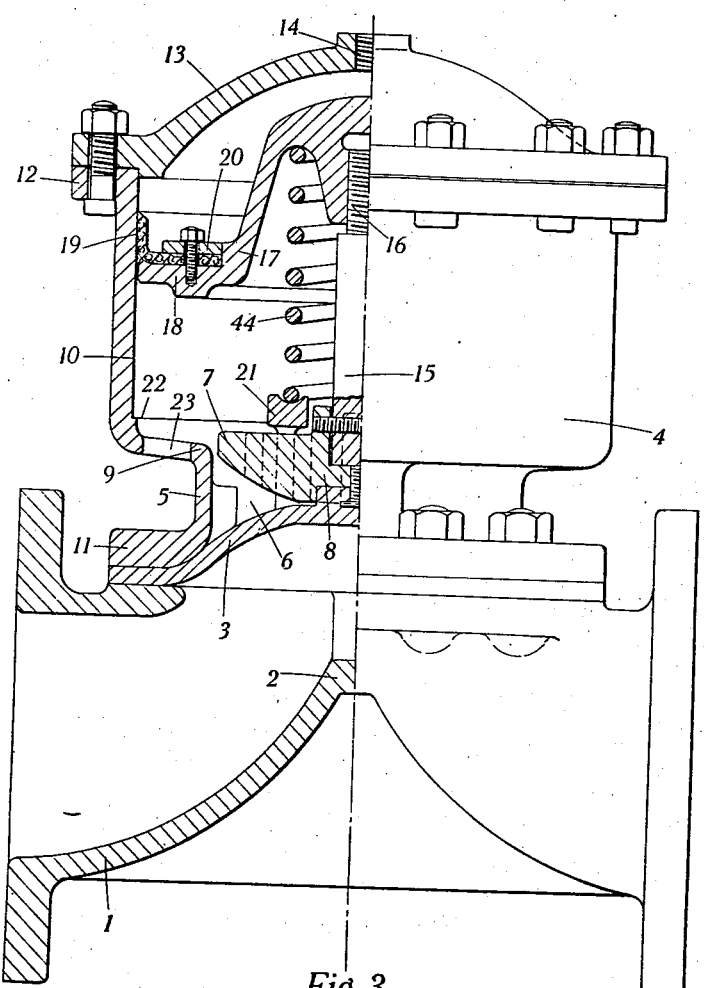

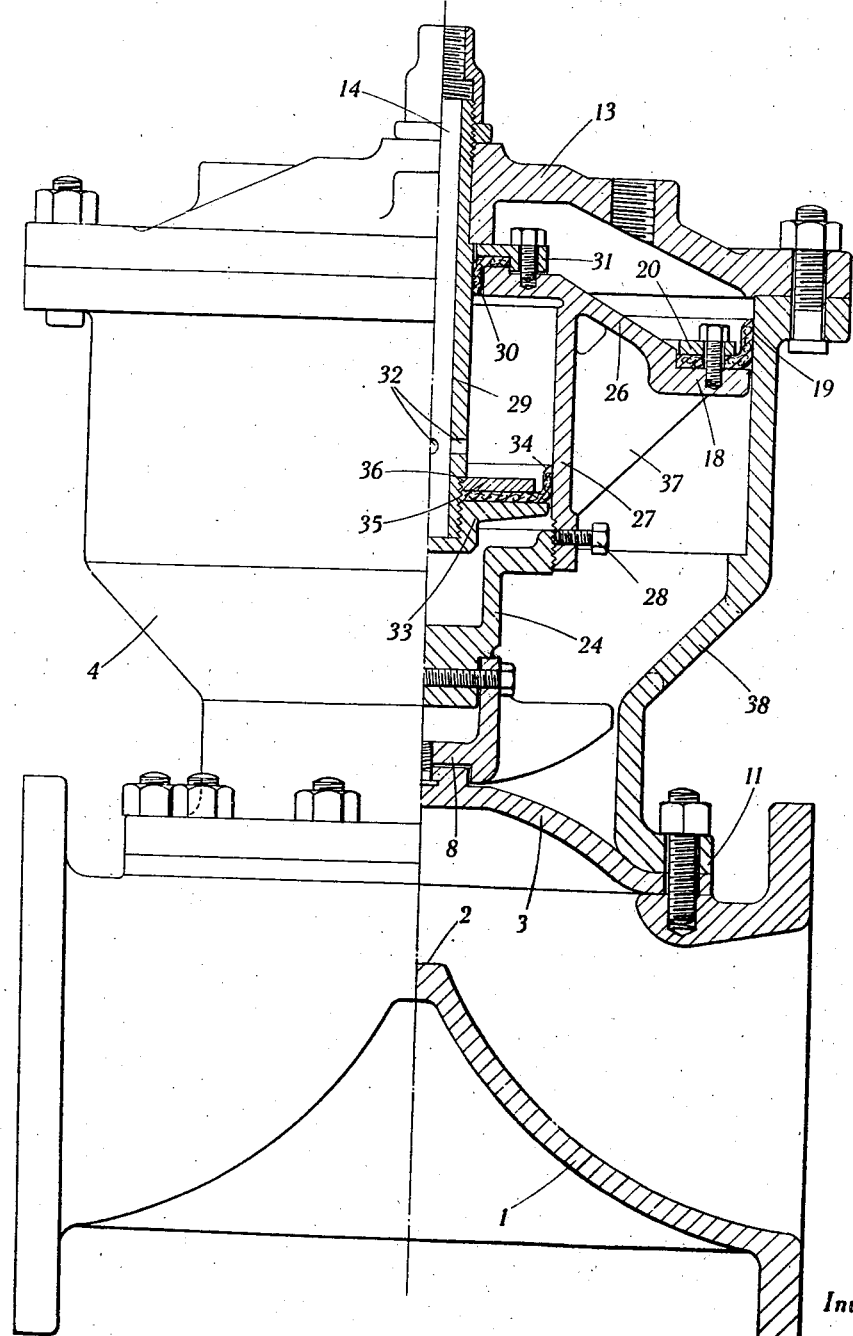

Patented May 7, 1940

2,199,549

UNITED STATES PATENT OFFICE 2,199,549

FLUID CONTROLLING VALVE

Philip Keith Saunders, Cwmbran, England

Application June 7, 1939, Serial No. 277,819
In Great Britain June 2, 1938

4 Claims. (Cl. 137—139)

This invention relates to diaphragm valves of the kind in which the body has a substantially straight through bore intersected by a shallow weir extending across the bore and having a concave face forming a seating for the diaphragm whose periphery is clamped between the circumferential flange of an opening in the side of the body and a casing or bonnet which accommodates the actuating gear.

For some purposes such valves have previously been operated by fluid pressure, for example, compressed air, acting on a piston (usually of somewhat larger cross-sectional area than the diaphragm) directly connected to the diaphragm actuator.

In the past the operating cylinder which accommodates the piston in such valves has been mounted above a conventional bonnet and has been made in two parts to enable it to be assembled; namely, an inverted truncated conical casing attached to the top of the bonnet and a cylindrical part above it providing the bore for the operating piston.

A principal object of this invention is to make the valve more compact and in particular to reduce its overall height. A further object is to simplify manufacture and assembly of the valve.

With these and other objects in view the bore for the piston is formed according to this invention in the bonnet itself.

In small valves as hitherto, the valve is closed by application of fluid pressure on the side of the piston remote from the diaphragm and is opened by a helical spring surrounding the spindle or the like by which the piston is attached to the diaphragm actuator. In large valves, however, according to a further feature of the invention, there is a double acting piston to a part of which the operating pressure is constantly applied on the side of the diaphragm and to the whole of which the operating pressure is controllably applied on the side remote from the diaphragm.

Further features of the invention will become apparent from the following description of the accompanying drawings in which:

Fig. 1 is an elevation half in section of a piston operated valve in accordance with the invention.

Fig. 2 is an elevation half in section of a large double acting piston valve in accordance with the invention.

Fig. 3 is a diagrammatic view showing the method of controlling the valve shown in Fig. 2.

Referring now to Fig. 1 the valve has a conventional body 1 whose bore is intersected by a shallow weir 2 extending across the bore and having a concave face forming the seating for the diaphragm 3. This diaphragm 3 is clamped around its periphery between the circumferential flange surrounding an opening in the side of the body 1 opposite the weir 2 and the attachment flange 11 on the bonnet 4.

The lower part 5 of the bonnet 4 adjacent to the valve body 1 is of conventional form; that is to say it has the conventional attachment flange 11 and the usual series of inwardly projecting fingers 6 for co-operation with conventional toes 7 on a conventional diaphragm actuator 8. About level with the top of the actuator 7 when it is in the open position, the wall of the bonnet is turned outwards (at 9) and then upwards to form the bore 10 of the cylinder in which the actuating piston operates.

The diameter of the part of the bonnet forming the bore 10 is substantially the same as that of the bonnet attachment flange 11 and therefore the diaphragm 3. Thus since a substantial part of the diaphragm is clamped between the flange 11 and the valve body 1 the cross sectional area of the operating piston is somewhat larger than the free area of the diaphragm exposed to the fluid controlled.

The wall of the bonnet 4 is turned out to form a flange 12 at the top to which a domed cover plate 13 having a central inlet 14 is attached. Through this inlet 14 the controlling fluid for operating the valve is introduced.

A short spindle 15 is pivotally attached to the diaphragm actuator 8 in the usual manner. This spindle has a threaded part 16 at the end remote from the actuator 8 to which the piston 17 is screwed. The piston is of conical form with a circumferential outwardly extending flange 18 so that this latter part is nearer the actuator than the centre, thus reducing the overall height of the valve. A cup leather 19 clamped by means of an annular washer 20 to the flange 18 ensures a tight joint between the piston 17 and the cylinder bore 10.

A helical spring 44 surrounds the spindle and is accommodated between the piston 17 and an abutment ring 21 integral with the inwardly projecting fingers 6 on the bonnet and on the side of them remote from the valve body 1. In very small valves a conical helical spring may be used and the ring 21 dispensed with. In the latter case the large end of the spring will bear against the outwardly turned part 9 of the bonnet wall.

The movement of the piston is limited in the valve closing direction by contact between the flange 18 and a raised ledge 22 on the outwardly turned part 9 of the bonnet wall. In the valve opening direction movement of the piston is limited by contact between the top of the actuator 8 and the underside of the ring 21. In use the piston is adjusted so that the closing stop allows the diaphragm to be compressed into good contact on to the weir. Adjustment is effected by rotating the piston 17 relatively to the spindle 15, which can be effected by means of a suitable implement through the aperture 23 in the part 9 of the bonnet wall.

Referring now to Fig. 2, in which like parts are indicated by like reference numerals, the valve body 1, diaphragm 3 and bonnet attachment and diaphragm actuator 8 are of conventional type as before.

To the actuator 8 is pivotally mounted a member 24. The piston comprises a conical part 26 from which depends a cylindrical part 27, which is screwed on to the circumferential part of the member 24 and locked in position by means of the set screw 28.

A cup leather 19 is attached as before to a circumferential flange 18 surrounding the part 26. From the central inlet 14 in the domed cover plate 13 a tube 29 depends and passes through a central aperture in the top of the piston around which a cup leather 30 clamped by an annular securing plate 31 is fixed so making a tight joint between the tube and the piston.

The tube 29 has lateral outlet holes 32 near its end and has mounted on its end a plate 33 upon which a cup leather 34 secured between it and a washer 35 abutting against a shoulder 36 on the tube ensures a tight joint with the internal bore of the cylindrical part 27 of the piston. Web shaped lugs 37 are provided on the under side of the part 26 of the piston for adjustment of the valve as hereinafter described by use of a suitable implement through the aperture 38 in the bonnet wall.

Connection of the valve to the operating fluid pressure is diagrammatically shown in Fig. 3. The pressure supply pipe 39 forks into two pipes 40 and 41. The former pipe 40 is connected to the central inlet 14. The latter pipe 41 is connected through a three-way control valve 42 either to the inside of the bonnet through a control inlet 43 in the cover plate 13 or to exhaust.

It will be observed therefore that the space on the side of the piston of the diaphragm within the cylindrical part 27 is constantly connected to the fluid pressure, whereas by operation of the valve 42 the whole space on the side of the piston remote from the diaphragm may be connected to fluid pressure or not.

If this latter space is connected to fluid pressure the pressure will be acting on a greater area of piston in the valve closing direction than in the valve opening direction and the valve will consequently close. When however the fluid pressure is connected only to the side of the piston of the diaphragm then of course the piston is moved in the valve opening direction and the valve opened. Thus the valve is operated by fluid pressure both to shut and to open.

The relative sizes of the piston and diaphragm in both types of valves as hereinbefore described are arranged so that the valve will operate using the pressure of the fluid controlled by the valve as operating pressure providing this is above say, 25 lbs. per square inch.

In addition the valves are so proportioned that using conventional compressed air at 90 lbs. per square inch the valve will operate up to the maximum permissible pressures.

As before the travel of the piston is limited in both directions; in the valve closing direction by contact with a ledge 22 and in the valve opening direction by contact between the plate 31 and a boss on the cover plate 13. Adjustment of the effective position of the closing stop is as before effected by rotating the piston relatively to the member 24 using a suitable implement through the aperture 38 upon the lugs 37.

What I claim is:

1. In a diaphragm valve, a body having an opening, a diaphragm extending across the opening, a bonnet disposed above said diaphragm and having an internal cylindrical bore, a backing member for actuating the diaphragm and attached to it, a piston connected to said backing member co-operating with said bore, means for constantly applying fluid pressure to a part of the piston on the side of the diaphragm, and means for controllably applying fluid pressure to substantially the whole of the piston on the side remote from the diaphragm.

2. In a diaphragm valve, a body having an opening, a diaphragm extending across the opening, an integral bonnet disposed above said diaphragm and having an internal cylindrical bore, a backing member for actuating the diaphragm and attached to it, a piston connected to said backing member co-operating with said bore, means for constantly applying fluid pressure to a part of the piston on the side of the diaphragm, and means for controllably applying fluid pressure to substantially the whole of the piston on the side remote from the diaphragm.

3. In a diaphragm valve, a body having an opening, a diaphragm extending across the opening, a bonnet disposed above said body and having an internal cylindrical bore, a backing member for actuating the diaphragm and attached to it, a piston co-operating with said bonnet bore connected to said backing member by a tubular part with an internal cylindrical bore of substantially smaller diameter than that of said bonnet bore and having a central aperture, a cover plate upon said bonnet with a central inlet and an offset control inlet, and a depending tube mounted centrally on said cover plate in register with said central inlet passing through said central aperture in said piston and having a plunger on its end to co-operate with the bore of said tubular part and an outlet to communicate with the space within said tubular part.

4. In a diaphragm valve, a body having an opening, a diaphragm extending across the opening, an integral bonnet disposed above said body and having an internal cylindrical bore, a backing member for actuating the diaphragm and attached to it, a piston co-operating with said bonnet bore connected to said backing member by a tubular part with an internal cylindrical bore of substantially smaller diameter than that of said bonnet bore and having a central aperture, a cover plate upon said bonnet with a central inlet and an offset control inlet, and a depending tube mounted centrally on said cover plate in register with said central inlet passing through said central aperture in said piston and having a plunger on its end to co-operate with the bore of said tubular part and an outlet to communicate with the space within said tubular part.

PHILIP KEITH SAUNDERS.